United States Patent [19]

Hamada et al.

[11] Patent Number: 5,178,243
[45] Date of Patent: Jan. 12, 1993

[54] HYDRAULIC DAMPER

[75] Inventors: Masahiko Hamada; Seiji Iwasawa; Seiji Miyazawa, all of Kanagawa, Japan

[73] Assignee: Atsugi Unisia Corporation, Atsugi, Japan

[21] Appl. No.: 697,872

[22] Filed: May 9, 1991

[30] Foreign Application Priority Data

May 10, 1990 [JP] Japan .................. 2-49033[U]

[51] Int. Cl.$^5$ ............................. F16F 9/36
[52] U.S. Cl. ............... 188/322.17; 92/165 R; 92/168; 188/315; 277/33; 277/35; 277/153
[58] Field of Search .......... 188/322.17, 315; 92/165 R, 168 R; 277/33, 35, 152, 153

[56] References Cited

U.S. PATENT DOCUMENTS

| 3,958,673 | 5/1976 | Allinquanti et al. | 188/315 X |
| 4,364,457 | 12/1982 | Wossner et al. | 188/322.17 |
| 4,482,036 | 11/1984 | Wossner et al. | 188/322.17 X |
| 4,602,707 | 7/1986 | Zumwinkel et al. | 188/315 |

FOREIGN PATENT DOCUMENTS

| 3151050 | 8/1982 | Fed. Rep. of Germany . |
| 4030788 | 5/1991 | Fed. Rep. of Germany . |
| 62-38574 | 8/1987 | Japan . |
| 2053411 | 2/1981 | United Kingdom . |
| 2092262 | 8/1982 | United Kingdom ........... 188/322.17 |
| 2237356 | 5/1991 | United Kingdom . |

Primary Examiner—George E. A. Halvosa
Attorney, Agent, or Firm—Bachman & LaPointe

[57] ABSTRACT

According to a hydraulic damper disclosed in the specification, a piston rod guide arrangement comprises a bushing in contact with a piston rod and a bushing retainer formed by pressing a sheet of metal to have an outer sleeve portion and an inner sleeve portion. An insert formed by pressing a sheet of metal is coupled with a cylinder. The retainer is coupled with the insert with the inner sleeve portion disposed between the insert the bushing.

13 Claims, 4 Drawing Sheets

HYDRAULIC DAMPER

BACKGROUND OF THE INVENTION

The present invention relates to a hydraulic damper of the type having a piston rod, and more particularly a rod guide for a piston rod in a hydraulic damper.

Japanese Patent Second (examined) Publication Tokko-Sho 62-38574 discloses a hydraulic damper. This known hydraulic damper comprises an outer shell, a cylinder disposed in the outer shell, and a piston rod disposed in the cylinder. A cap covers an open axial end of the outer shell. The piston rod has a piston slidably disposed in the cylinder, and extends through the cap. The piston divides the cylinder into an upper chamber adjacent an axial open end of the cylinder and a lower chamber adjacent the closed axial end of the cylinder. The cylinder and outer shell cooperate with each other to define therebetween a reservoir chamber. In order to guide the piston rod, this hydraulic damper comprises a bearing formed by pressing a sheet of a low friction material, and an insert of a metal. The bearing has an outer sleeve portion coupled with the cap which is in turn coupled with the outer shell and an inner sleeve portion with an inner peripheral wall held in slidable engagement with the piston rod. The insert is fixedly connected to the bearing and coupled with the cylinder. In order to prevent oil leakage past between the cap and the piston rod, a sealing assembly is provided. This sealing assembly includes a packing and a packing spring. The packing spring having one end bearing against a radially extending portion of the bearing and an opposite end bearing against a packing back-up plate.

An object of the present invention is to improve a hydraulic damper of the above-mentioned type in such a manner as to guide a piston rod without using a bearing formed by pressing a low friction material which is expensive.

SUMMARY OF THE INVENTION

According to the present invention, there is provided a hydraulic damper comprising:
an outer shell;
a cylinder, having an axial end, disposed in said outer shell;
a piston rod disposed in said cylinder;
a bearing having an outer sleeve portion including an outer peripheral wall opposed to said outer shell and an inner sleeve portion including an inner peripheral wall opposed to said piston rod; and
an insert connected to said bearing and coupled with said cylinder,
wherein
said bearing includes a bushing in contact with said piston rod and a retainer formed by pressing a sheet of metal to have said outer sleeve portion and said inner sleeve portion; and
said retainer is coupled with said insert with said inner sleeve portion inserted into said cylinder and disposed between said insert and said bushing.

According to one embodiment of the present invention, the retainer has an intermediate sleeve portion including one end connected to the inner sleeve portion via a shoulder portion, and the insert is formed by pressing a sheet of metal to have a reduced diameter portion inserted into said cylinder between the cylinder and the inner sleeve portion of the retainer, an enlarged diameter portion opposed to the intermediate sleeve portion, and a radially extending annular portion interconnecting the reduced and enlarged diameter portions. The radially extending portion of the insert is disposed between said shoulder portion of said retainer and said axial end of said cylinder.

According to one feature of this embodiment, the retainer has a radially extending portion connected to the intermediate sleeve portion and extending radially outwardly therefrom, and a ramp portion interconnecting the radially extending portion and the outer sleeve portion. An annular seal carrier extending between said piston rod and said outer shell is disposed in axial fit manner with respect to the outer shell and opposed to the radially extending portion of said retainer.

According to another feature of this embodiment, an outer seal element fixedly carried by the annular seal carrier is in sealing contact with the ramp portion of the retainer and the outer shell, and an inner seal element fixedly carried by the annular seal carrier in sealing contact with the piston rod.

DETAILED DESCRIPTION OF THE INVENTION

Figure 1:
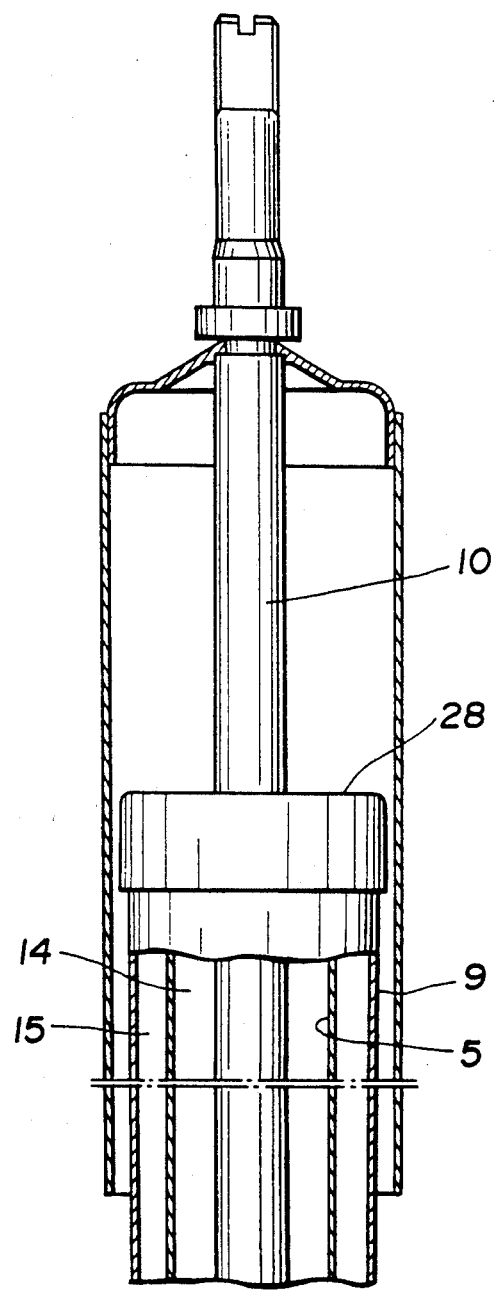
FIG. 1 is a fragmentary view, partly sectioned, of a first embodiment of a hydraulic damper embodying the present invention.

Referring to FIG. 1, a hydraulic damper comprises a cylinder 5 disposed in an outer shell 9. The cylinder 5 has a lower closed axial end, not illustrated, and an upper open axial end, not illustrated. A piston, not illustrated, is slidably disposed in the cylinder 5 to define an upper chamber 14 adjacent the upper open axial end, and a lower chamber, not illustrated, adjacent the lower closed axial end. Defined between the cylinder 5 and the outer shell 9 is a reservoir chamber 15.

A piston rod 10 of the piston is disposed in the cylinder 5 extends through the upper open axial end of the cylinder 5 and a cap 28 coupled with and threadedly engaged with the outer shell 9. The piston rod 10 cooperates with the cylinder 5 to define therebetween an annular chamber serving as the upper chamber 14.

Figure 2:
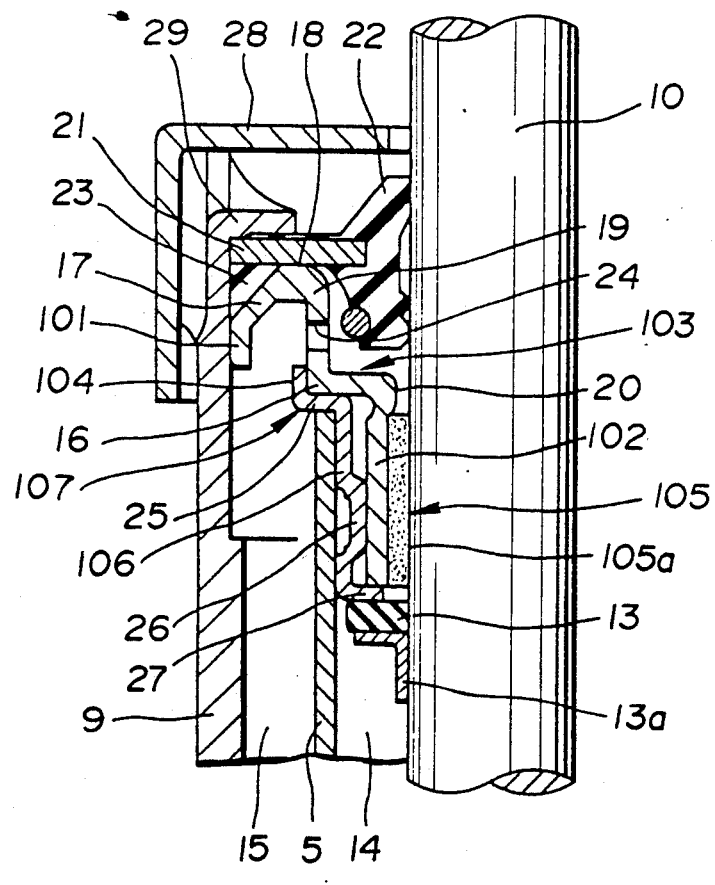
FIG. 2 is an fragmentary enlarged view of FIG. 1, partly sectioned.

As best seen in FIG. 2, a bearing includes a bushing 105 with a cylindrical inner surface 105a coated with a low friction material, and a retainer 103. The retainer 103 is formed by pressing a sheet of a metal which is not made of a low friction material, and has an outer sleeve portion 101 with an outer peripheral wall opposed to the outer shell 9 and an inner sleeve portion 102 including an inner peripheral wall backing the bushing 105. An insert 107 formed by pressing a sheet of metal is coupled with the cylinder 5. As readily seen from FIG. 2, the retainer 103 is coupled with the insert 107 with the inner sleeve portion 102 disposed between the insert 107 and the bushing 105. Thus, the inner sleeve portion 102 is inserted into the cylinder 5 and disposed in the annular chamber 14.

The retainer 103 has an intermediate sleeve portion 19 including one end (a lower end viewing in FIG. 2) connected to the inner sleeve portion 102 via a shoulder portion 16, a radially extending portion 18 connected to the opposite end of the intermediate sleeve portion 19 and extending radially outwardly therefrom. The radially extending portion 18 defines a flat annular surface. An inclined ramp portion 17 interconnects the radially extending portion 18 and the outer sleeve portion 101.

The insert 107 has a reduced diameter portion 106 inserted into the cylinder 5 between the inner wall of the cylinder 5 and the inner sleeve portion 102, an enlarged diameter portion 104 opposed to the intermediate sleeve portion 19, and a radially extending annular portion 25 interconnecting the reduced and enlarged diameter portions 106 and 104. The radially extending annular portion 25 is disposed between the shoulder portion 16 and the open axial end of the cylinder 5. The reduced diameter portion 106 has one axial end (an upper end as viewed in FIG. 2) connected to the radially extending annular portion 25 and an opposite axial end (a lower end as viewed in FIG. 2). The insert 107 also has a second radially extending portion 27 connected to the opposite axial end of the reduced diameter portion 106. The second radially extending portion 27 extends radially inwardly toward the piston rod 10. The second radially extending portion 27 is opposed to an axial end of the inner sleeve portion 102 of the retainer 103.

In order to restrain axial movement of the bushing 105, the inner sleeve portion 102 of the retainer 103 includes a projection 20 adjacent to that one axial end which is connected to the shoulder portion 16. This projection 20 serves as a stop to limit an axial movement of the bushing 105 in an upward, viewing in FIG. 2, direction away from the second radially extending portion 27.

In order to increase a radial support rigidity of the bushing 105, the reduced diameter portion 106 includes a protruded portion 26 bearing against the inner sleeve portion 102 of the retainer 103.

FIG. 2 shows the positions of parts wherein a stop rubber 13 fixed to a seat 13a fixedly welded to the piston rod 10 abuts the second radially extending portion 25 to limit an extending movement of the hydraulic damper.

In order to allow a hydraulic fluid past the bushing 105 to return to the reservoir chamber 15, the intermediate sleeve portion 19 of the retainer is formed with a plurality of return holes, only one being shown at 24.

In order to prevent a leakage of hydraulic fluid through a clearance between the cap 28 and the piston rod 10, a sealing assembly is provided. This sealing assembly includes an annular seal carrier or ring 21 extending between the piston rod 10 and the outer shell 9. The seal carrier 21 lies on the radially extending portion 18 of the retainer 103 and is mounted in axial fit matter. To mount the seal carrier 21 in the axial fit manner, a plurality of tip portions, only one being shown at 29, of the outer shell 9 are curved inwardly to lie on the seal carrier 21. As readily understood from FIG. 2, the cap 28 is threadedly coupled with the outer shell 9 until the axial end of the outer shell abuts the cap 28. The seat carrier 21 fixedly carries an outer seal element 23 in sealing contact with the ramp portion 17 of the retainer 103 and the outer shell 9, and an inner seal element 22 in sealing contact with the piston rod 10.

It will be appreciated that the sealing assembly does not require a packing spring, making much contribution to a reduction in axial spacing necessary for sealing.

It will also be appreciated that an axial load in such a direction as to remove the retainer 103 and the insert 107 is beared through the seal carrier 21 by the outer shell 9.

From the preceding description, it will be understood that it is no more necessary to form the whole of the bearing by pressing a sheet of expensive low friction material.

The preceding embodiment will be more clearly understood if a reference is made to the manner of mounting the parts.

In assembly, the bushing 105 is press fit in the inner sleeve portion 102 of the retainer 103. The insert 107 is coupled with the retainer 103 at the shoulder portion 16. The preassembly is mounted in such a manner that the outer sleeve portion 101 is coupled with the outer shell 9 and the reduced diameter portion 106 is coupled with the cylinder 5. In this mounting process, the bushing 105 is coupled with the piston rod 10, so that the cylindrical inner surface 105a is held in sealing contact with the piston rod 10. The sealing assembly is axially inserted to a position wherein the seal carrier 21 lies on the radially extending portion 18 of the retainer 103 with the outer seal element 23 is in contact with the ramp portion 17 and the outer shell 9 and the inner seal element 22 in contact with the piston rod 10. Then, the tip portions 29 is curved inwardly to lie on the seal carrier 21 to bias same toward the radially extending portion 18 of the first retainer 103. Finally, the cap 28 is coupled with the piston rod 10 and threadedly engaged with the outer shell 9 by turning the cap 28 until the axial end of the outer shell 9 abuts the cap 28.

Figure 3:
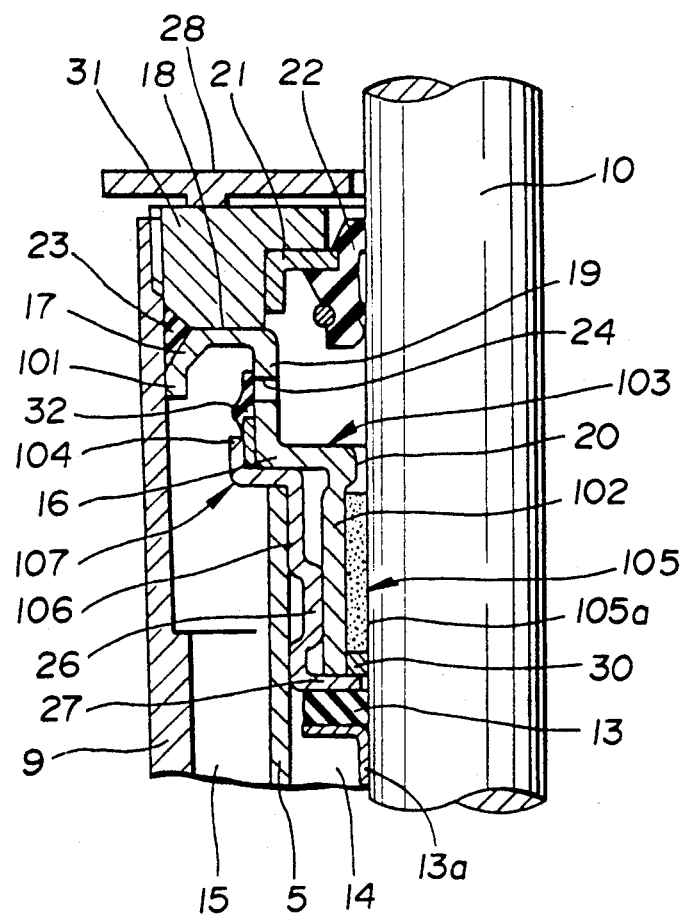
FIG. 3 is a similar view to FIG. 2 showing a second embodiment.

Referring to FIG. 3, a second embodiment is described. The second embodiment is substantially the same as the first embodiment. However, the second embodiment is different from the first embodiment in that a second radially extending portion 27 extends inwardly further than its counterpart in FIG. 2 and it is opposed to the adjacent axial end of a bushing 105. Between the bushing 15 and the second radially extending portion 27 is a seal ring 30. Another difference resides in an annular seal carrier. The seal carrier of this embodiment includes an annular body 31 threadedly engaged with an outer shell 9 and a seal retainer 21 fixedly connecteed to the body 31. In this embodiment, the annular seal carrier is threadedly engaged with the outer shell 9. In FIG. 3, the reference numeral 32 denotes a check seal to prevent reverse flow through the return holes 24.

Figure 4:
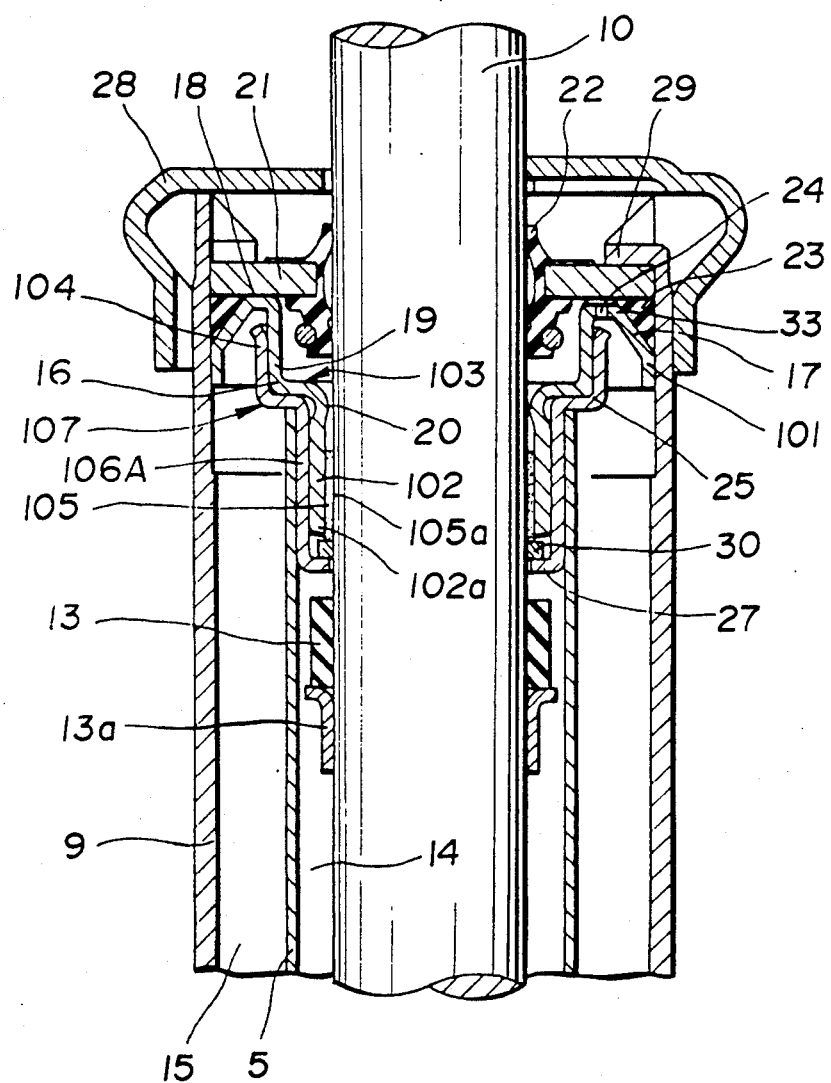
FIG. 4 is a generally similar view to FIG. 2 showing a third embodiment.

Referring to FIG. 4, a third embodiment is described. This third embodiment is substantially the same as the first embodiment. However, the third embodiment is different from the first embodiment in that a reduced diameter portion 106 is not provided with a protruded portion shown at 26 in FIG. 2. Instead, an inner sleeve portion 102 of a retainer 103 is slightly curved outwardly at 102a. Another difference resides in location of return holes which the retainer 103 is formed with. In this embodiment, a radially extending portion 18 of the retainer 103 is formed with a plurality of radially extending grooves and a plurality of return holes, only one being shown at 24, each opening at the bottom of the corresponding one of the grooves.

What is claimed is:
1. A hydraulic damper comprising:
 an outer shell;
 a cylinder, having an axial end, disposed in said outer shell;
 a piston rod disposed in said cylinder;
 a bushing in contact with said piston rod;

an insert coupled with and inserted into said cylinder;

a retainer having an outer sleeve portion including an outer peripheral wall in engagement with said outer shell and an inner sleeve portion inserted into said cylinder and disposed between said bushing and said insert, said inner sleeve portion including an inner peripheral wall supporting said bushing;

one of said inner sleeve portion and said insert having a protruded portion which is so constructed and arranged between said bushing and said cylinder as to increase radial support rigidity of said bushing.

2. A hydraulic damper as claimed in claim 1, wherein said retainer has an intermediate sleeve portion including one end connected to said inner sleeve portion via a shoulder portion, and said insert is formed by pressing a sheet of metal to have a reduced diameter portion inserted into said cylinder between said cylinder and said inner sleeve portion of said retainer, and enlarged diameter portion opposed to said intermediate sleeve portion, and a radially extending annular portion interconnecting said reduced and enlarged diameter portions, said radially extending portion of said insert being disposed between said shoulder portion of said retainer and said axial end of said cylinder.

3. A hydraulic damper as claimed in claim 2, wherein said reduced diameter portion has one axial end connected to said radially extending annular portion and an opposite axial end, and said insert has a second radially extending portion connected to said opposite axial end of said reduced diameter portion and extending radially inwardly from said opposite axial end toward said piston rod.

4. A hydraulic damper as claimed in claim 3, wherein said inner sleeve portion of said retainer has one axial end connected to said shoulder portion and an opposite axial end, and said second radially extending portion of said insert is opposed to said opposite axial end of said inner sleeve portion of said retainer.

5. A hydraulic damper as claimed in claim 4, wherein said inner sleeve portion of said retainer includes a projection adjacent said one axial end thereof, said projection serving as a stop to limit an axial movement of said bushing in one direction away from said second radially extending portion of said insert.

6. A hydraulic damper as claimed in claim 5, wherein said bushing has one axial end engageable with said projection and an opposite end, and said second radially extending portion extends inwardly further to oppose said opposite end of said bushing to limit an axial movement of said bushing in an opposite direction toward said second radially extending portion.

7. A hydraulic damper as claimed in claim 6, wherein a seal ring is disposed between said opposite axial end of said bushing and said second radially extending portion.

8. A hydraulic damper as claimed in claim 2, wherein said retainer has a radially extending portion connected to said intermediate sleeve portion and extending radially outwardly therefrom, and a ramp portion interconnecting said radially extending portion of said retainer and said outer sleeve portion of said retainer.

9. A hydraulic damper as claimed in claim 8, further comprising a sealing assembly, wherein said sealing assembly includes an annular seal carrier extending between said piston rod and said outer shell, said annular seal carrier being disposed in axial fit manner with respect to said outer shell and opposed to said radially extending portion of said retainer.

10. A hydraulic damper as claimed in claim 9, wherein said sealing assembly includes an outer seal element fixedly carried by said annular seal carrier in sealing contact with said ramp portion of said retainer and said outer shell, and an inner seal element fixedly carried by said annular seal carrier in sealing contact with said piston rod.

11. A hydraulic damper as claimed in claim 10, wherein said outer shell includes tip portions curved inwardly to lie on said annular seal carrier, so that said annular seal carrier lies on said radially extending portion of said retainer.

12. A hydraulic damper as claimed in claim 1, further comprising a cap, wherein said threadedly engaged with said outer shell.

13. A hydraulic damper comprising:

an outer shell;

a cylinder, having an axial end, disposed in said outer shell;

a piston rod disposed in said cylinder;

a bushing in contact with said piston rod;

an insert formed by pressing a sheet of metal and having a reduced diameter portion disposed in said cylinder;

a retainer formed by pressing a sheet of metal and having an outer sleeve portion including an outer peripheral wall in engagement with said outer shell and an inner sleeve portion inserted into said cylinder and disposed between said bushing and said insert, said inner sleeve portion including an inner peripheral wall supporting said bushing;

said reduced diameter portion of said insert having a protruded portion bearing against said inner sleeve portion of said retainer, whereby a radial support rigidity of said bushing is increased.

* * * * *